United States Patent [19]

Smith

[11] Patent Number: 4,531,358
[45] Date of Patent: Jul. 30, 1985

[54] OIL SYSTEM FOR AIRCRAFT GAS TURBINE ENGINE

[75] Inventor: Stanley Smith, Wotton-under-Edge, England

[73] Assignee: Rolls-Royce Limited, London, England

[21] Appl. No.: 305,706

[22] Filed: Sep. 25, 1981

[30] Foreign Application Priority Data

Sep. 26, 1980 [GB] United Kingdom ............... 8031265

[51] Int. Cl.³ ............................................. F02C 7/06
[52] U.S. Cl. ................................... 60/39.08; 184/6.11
[58] Field of Search ..................... 60/39.08; 184/6.02, 184/6.11

[56] References Cited

U.S. PATENT DOCUMENTS

| 3,722,624 | 3/1973 | Buckland | 184/6.11 |
| 4,049,401 | 9/1977 | Smith | 55/184 |
| 4,117,907 | 10/1978 | Lechler | 184/6.2 |
| 4,153,141 | 5/1979 | Methlie | 60/39.08 |

FOREIGN PATENT DOCUMENTS

| 2358615 | 2/1978 | France | 60/39.08 |
| 1508212 | 4/1978 | United Kingdom . | |

Primary Examiner—Louis J. Casaregola
Attorney, Agent, or Firm—Parkhurst & Oliff

[57] ABSTRACT

A fully aerobatic oil system for an aircraft gas turbine engine includes two re-circulatory oil systems the pumps for which have inlets 19 and 31a disposed at locations in the engine such that when one inlet is starved of oil, due to the aircraft attitude changing, oil will be supplied to the other one. In a specific embodiment, the breather of the oil system 30 (FIG. 2) is positioned in the engine gearbox and provides the lowest pressure point in the system. The breather is of the type described in UK Pat. No. 1,508,212 which includes a rotating compartment filled with RETIMET (Regd. Trade Mark). The bearing chambers are pressurised with air from the engine and the air/oil mixture in each chamber is vented via a first series of vents 24 to the breather where the air and oil are separated. The breather is used as a pump to pump the separated oil back to the oil tank via a scavenge line 35 which includes a relief valve 38. A bleed line 36 takes some of the oil from line 35 to the main oil supply gallery 23 via a non-return check valve 37. In normal flight pump 20 supplies the gallery 23 from the tank 18 via pump inlet 19, the relief valve 38 being set to a pressure lower than that of relief valve 40 which controls the pump pressure. The check valve 37 thus remains shut. When the inlet 19 is starved of oil because the flight attitude of the aircraft changes, the pressure in gallery 23 drops to the extent that check valve 37 opens and the breather/pump takes over circulating oil from the gearbox and bearings around the second system.

10 Claims, 5 Drawing Figures

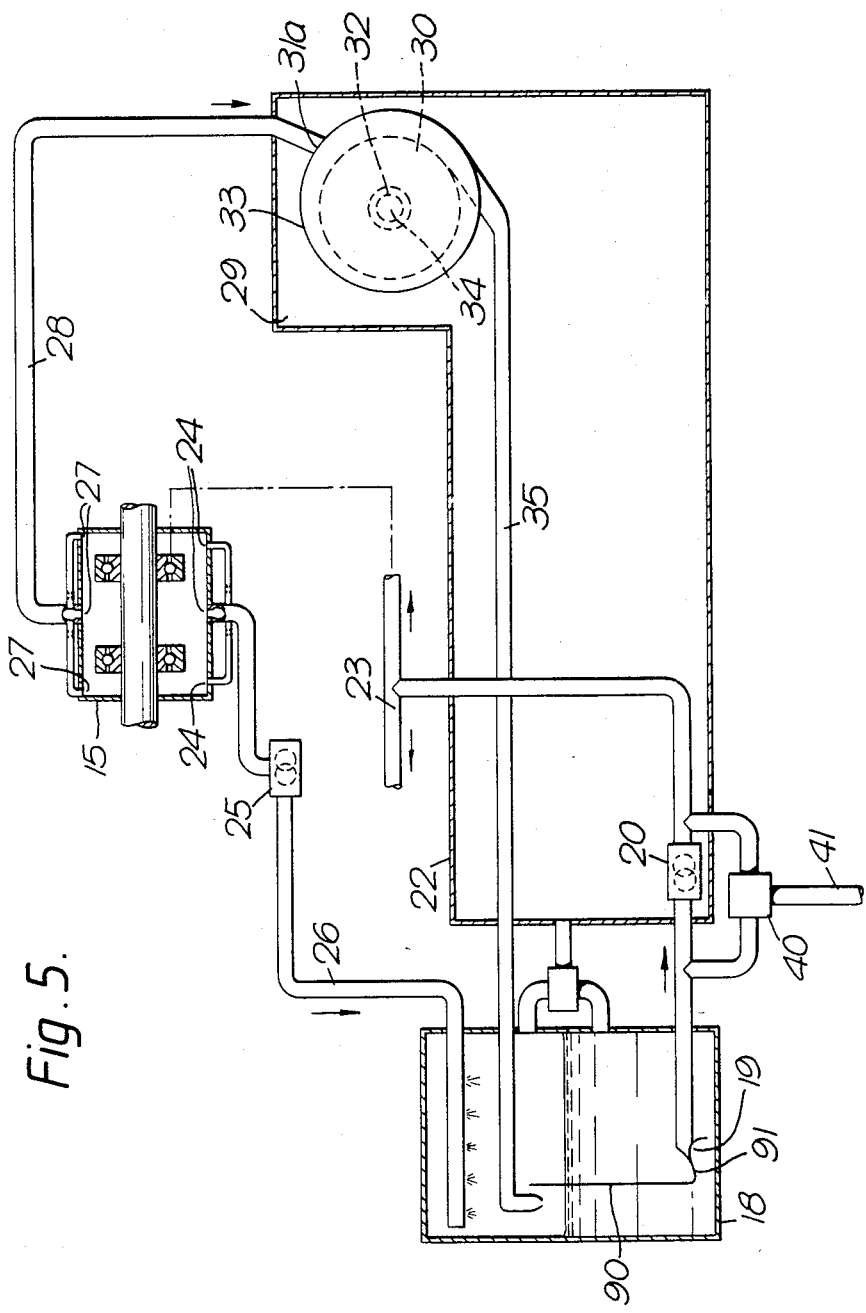

OIL SYSTEM FOR AIRCRAFT GAS TURBINE ENGINE

BACKGROUND OF THE INVENTION

The present invention relates to an oil system for an aircraft gas turbine engine, and relates in particular to an oil system which provides an uninterrupted supply of oil to the engine bearing chambers during any aerobatic maneuvers of the aircraft.

Many proposals have been made to avoid the problems associated with oil starvation in the bearing chambers when, for example, an aircraft takes up an inverted attitude, and the oil in the oil tank falls away from the pump inlet preventing the pump from supplying any oil. As a result, in addition to the possibility of bearing failure, the cooling effect of the oil is removed so that the walls of the chamber heat up, increasing the risk of an oil fire when normal oil flow is restored.

The proposals have usually centred around the provision within the tank of baffles to maintain a reservoir of oil at the pump inlet during inverted flight, and the positioning of the pump inlet within the reservoir so that the pump continues to supply oil for a limited period.

These solutions have enabled limited aerobatic maneuvers to be performed but have not enabled aircraft to remain in attitudes other than normal level flight, or to sustain zero or high "g" maneuvers for significant lengths of time.

SUMMARY OF THE INVENTION

The present invention provides a solution to the problem by ensuring that under those flight conditions during which the main pump inlet in the engine oil tank is deprived of oil due to gravitational or centrifugal effects, oil which is within other areas of the engine falls, or is forced, to another location within the engine from which it is pumped into the main oil supply conduits and thence to the bearings.

According to the present invention an oil system for an aircraft gas turbine engine comprises a first re-circulatory oil supply system for supplying oil to the engine bearings under some flight conditions of the aircraft, and including a pump having an inlet for receiving oil from a first location in the engine and means for returning the oil to said first location of the engine from the bearings under said flight conditions of the aircraft, and a second re-circulatory oil supply system for supplying oil to the engine bearings at least under certain other flight conditions of the aircraft, said second system including a pump having an inlet disposed in another location of the engine to which engine oil migrates during said other flight conditions of the aircraft and means for returning the oil to said other location from the bearings during said other flight conditions of the aircraft.

The oil may migrate to the second location under gravity, as for example when the aircraft goes into inverted flight, or may be impelled there by air pressure within the system. In the latter case the second location is preferably the lowest pressure region of the oil system, for example, the breather chamber.

The first location will preferably be the usual engine oil tank and the pump of the first oil supply system will be the main engine oil pump which conventionally is a gear pump.

The second location may be in any area of the engine. In a gravity fed system for example, the second location is preferably opposite to the inlet of the pump of the first system both axially and circumferentially so that the oil in the engine automatically migrates there when the aircraft maneuver is such as to take the oil away from the first inlet in the tank. However, in a pressurised system there is more flexibility on the positioning of the second pump inlet.

In a preferred embodiment the second location is in the breather chamber of the engine gearbox and the breather is of the kind described in our U.K. Pat. No. 1,508,212 in which oil separation from the air is carried out in a rotating chamber filled with a rigid porous material sold under the Trade Mark RETIMET by Dunlop Limited. In such an embodiment the breather can operate as a pump and becomes the pump of the second re-circulatory system, and in a further modification of this embodiment the breather may act also as the pump in the first re-circulatory oil system.

The invention will now be more particularly described by way of example only, and with reference to the accompanying drawings in which:

DETAILED DESCRIPTION OF PREFERRED EMBODIMENTS

Figure 1:
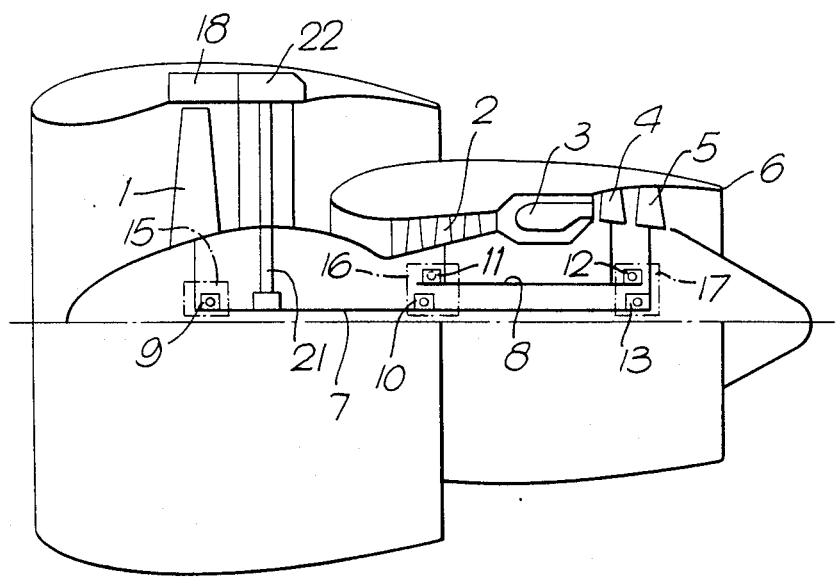
FIG. 1 is a view of a gas turbine engine incorporating an oil system of the present invention.

Referring now to the drawings, in FIG. 1 there is shown a gas turbine engine, which may be of any type, but which in this example includes compressor means 1, 2, combustion equipment 3 and turbine 4, 5. Exhaust gases from the turbine 5 pass to atmosphere through a propulsion nozzle 6. Shafts 7 and 8 interconnect the turbines 4, and 5 with respective compressors 2, 1 and the shafts are supported in bearings 9, 10, 11, 12 and 13, which are located in bearing chambers 15, 16 and 17.

The bearings are lubricated with oil which is supplied from a tank 18 via a main pump (not shown) which is driven from one of the engine main shafts by a drive shaft 21. A gearbox 22 is situated adjacent the oil tank and contains the gearing required for all the accessory drives. Also the bearing chambers are pressurised by air flowing into them through labyrinth seals in order to prevent oil leakage. As in many conventional oil systems the bearing chambers are vented through a scavenge system whereby the oil is returned to the tank 18. The scavenge system includes the usual oil cooler and breather (not shown in FIG. 1).

It is the manner in which the bearing chambers are scavenged and supplied with oil which is the subject of this invention.

Figure 2:
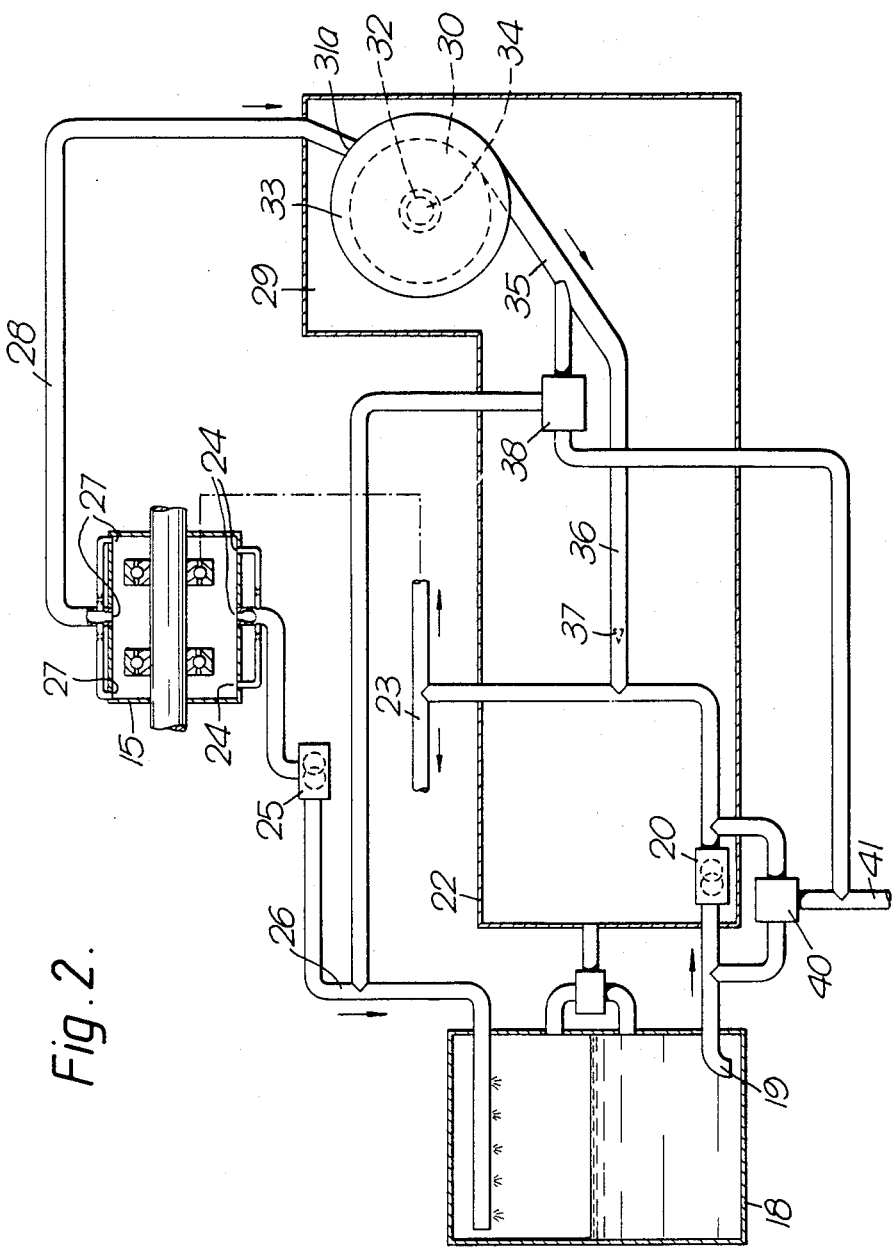
FIG. 2 is a diagrammatic illustration of the oil system of the engine of FIG. 1.

Turning now to FIG. 2 the general layout of one embodiment of the system is shown diagramatically.

A main pump 20 supplies oil from the tank 18 via an inlet 19 to the main oil supply gallery 23 which directs the oil to the bearing chambers 15, 16 and 17 only one of which, 15, is shown. A first series of vents 24 is provided for scavenging the oil from the bearing chambers during steady flight conditions of the aircraft, including some climb or dive conditions. The scavenging may be achieved wholly by the pressurisation of the bearing chamber, or by a combination of the air pressure in the bearing chamber and a conventional scavenge pump 25. The oil is returned to the tank 18 via a first scavenge line 26.

Additional vents 27 are provided which communicate via a second scavenge line 28 between the bearing chambers and the gearbox 22. In the gearbox is provided a chamber 29 in which is located the breather 30 which vents the gearbox to atmosphere thus providing the lowest pressure point in the oil system.

Figure 4:
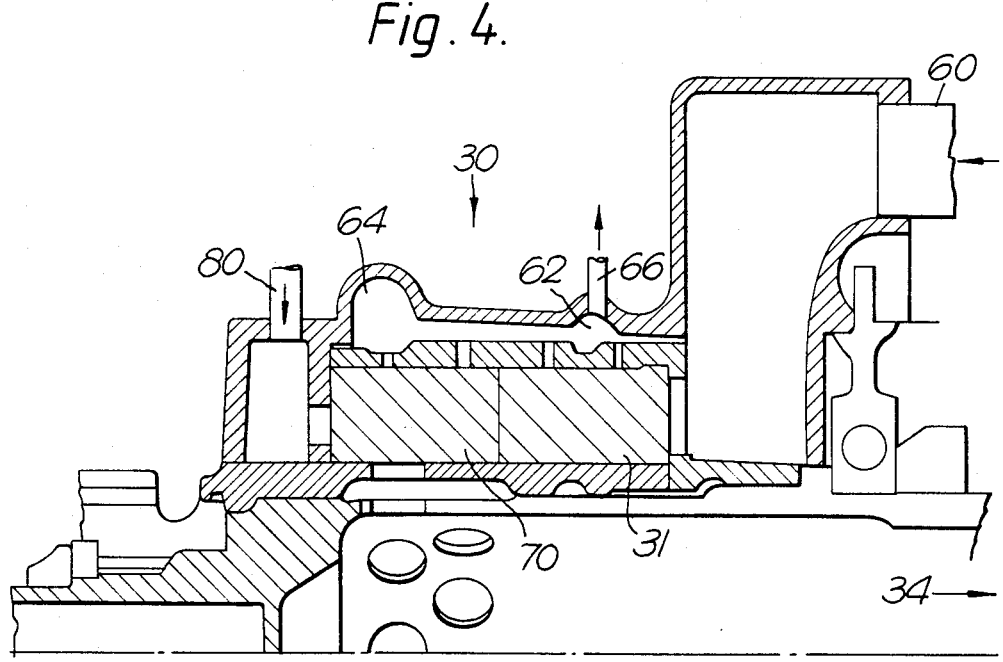
FIG. 4 is an enlarged view of a part of the oil system of FIG. 3, and, FIG. 5 is a diagrammatic illustration of a modified system based on that shown in FIG. 2.

The breather, a modified form of which is shown in FIG. 4, consists of at least one compartment 31 filled with a reticulated porous structure sold under the Trade Mark RETIMET by Dunlop Limited and which is mounted on a shaft 32 so as to be rotatable within a housing 33. Emulsified oil from the bearing chambers 15, 16, 17 enters an inlet 31a to the compartment 31 where centrifugal force separates the oil from the air. The oil passes to the radially outer part of the compartment for collection and the air passes to the radially inner part and is vented from the system at 34. An example of such a breather is described in our U.K. Pat. No. 1,508,212.

Under normal non-aerobatic flight conditions of the aircraft, the main pump 20 operates normally and the scavenge pump 25 and line 26 provide a first re-circulating oil system. During this time the vents 27 vent air from the bearing chambers to the breather chamber 29 in the gearbox, where any oil in the air from the vents or in the gearbox generally is separated out and the air is dumped overboard. It has been found that the centrifugal force on the oil within the rotating porous structure in compartment 31 provides such a high dynamic head that the breather 30 can be used to pump the separated oil back to the tank. Thus a scavenge line 35 is provided from the breather/pump to communicate with the scavenge line 26.

In order to provide for a fully aerobatic oil system, in this embodiment use is made of the pumping capability of the breather to act as a second pump for supplying oil to the bearing chambers.

A bleed line 36 is provided which takes a proportion of the oil from the scavenge line 35 and supplies it to the upstream side of a non-return check valve 37, the downstream side of which open to the main oil supply gallery 23. A pressure relief valve 38 is also provided in the svavenge line 35 upstream of the bleed line 36 and which is set to open at a pressure slightly lower than that of a relief valve 40 controlling the main pump.

Thus although a continuous supply of oil from the breather/pump is available in the line 36, the pressure relief valve 38 ensures that the pressure in the line 36 is less than that in the main oil supply gallery 23, so that the non-return check valve 37 remains closed and the oil in line 36 spills back to the main scavenge line 26 through line 35 and relief valve 38.

Whenever the aircraft adopts an attitude such that the oil in the tank falls away from the inlet 19 of the main pump, the oil in the gearbox will fall onto the breather; and the oil in the bearing chambers will fall away from the normal scavenge vents 24 and enter one or more of the additional vents 27. Thus the breather will be supplied with a significant amount of oil which will be pumped to the scavenge line 35 and to the bleed line 36.

At the same time the pressure in the main oil gallery 23 will fall and the check valve 37 will open to supply the bearing chambers with oil. This supply will be maintained as long as the aircraft remains in the new attitude since the additional vents will continue to return the bearing chamber oil to breather chamber 29 in the gearbox.

In addition there will be circulation back towards the main pump 20 but the relief valve 40 will ensure that the pressure in the gallery is maintained. If the normal gallery supply pressure is exceeded by the secondary breather/pump the relief valve will open and allow oil to spill to the inlet of the main pump 20 to prime it and excess oil will return to the tank from which it will spill to the gearbox. Both of the relief valves receive their reference pressure from the bearing chambers via a pressure line 41.

Hence an entire secondary circulation system is established which maintains the oil supply to the bearing chambers until normal flight conditions are restored. By positioning the breather in the gearbox, the only additional features required to give a completely aerobatic oil system are the line 36, and valves 37,38 so that a very simple and cheap modification is all that is required for a fully aerobatic oil system Clearly variations may be introduced into the system as described above while still maintaining the principle advantages of the invention. For example, the breather/pump 30 may have a bifurcated outlet communicating respectively with scavenge line 35 and bleed line 36 with consequent re-location of the relief valve to maintain control over the bleed supply.

In the above-described embodiment the breather has been designed such that it can also perform a pumping function. In an alternative arrangement however, an entirely separate secondary system may be provided in which an additional tank or chamber is located at a suitable position on the engine to which is led oil from the additional bearing chamber vents during certain aerobatic flying conditions. The secondary pump can then be provided at any suitable location provided that the inlet of the pump is positioned in the secondary chamber or tank. The secondary pump may be continuously running or selectively operable by the pilot. If it is continuously running so that the system is fully automatic, provision may have to be made to prevent it burning out or boiling any oil which is provided to keep it primed when not required.

Figure 3:
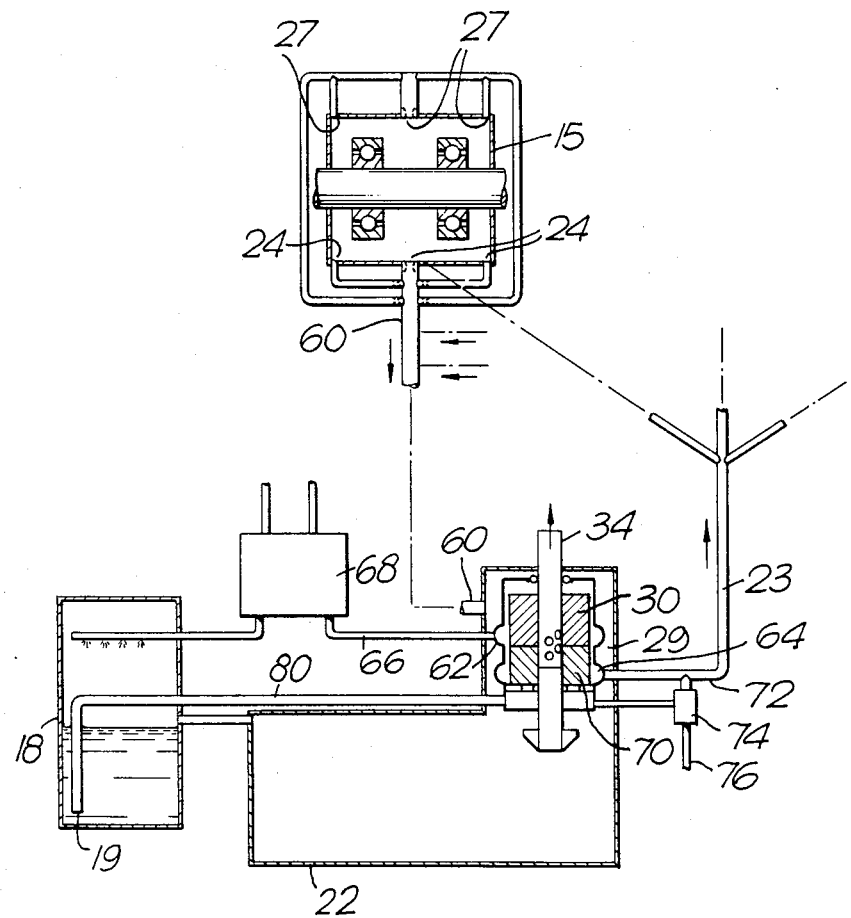
FIG. 3 is a diagrammatic representation of an alternative embodiment of the invention.

In an alternative embodiment shown in FIGS. 3 and 4, use is made of the pumping capability of the breather to provide both the main and secondary pumping functions. Also, by relying on the air pressurisation of the bearing chambers the scavenge pumps 25 may be eliminated.

Referring now to FIGS. 3 and 4, features common with the embodiment of FIGS. 1 and 2 are given the same reference numerals. In this embodiment all of the vents 24 and 27 from the bearing chamber 15 communicate with a single scavenge line 60. It will be understood that the vents from the other two bearing chambers 16 and 17, which are not illustrated, will also communicate with the scavenge line 60.

The hot oil and air mixture from the bearing chambers is impelled due to the air pressure in the bearing chambers along the scavenge line 60 to the inlet of the breather 30.

In this particular embodiment the breather housing is provided with two oil collecting scrolls 62 and 64 into which oil, which has been separated from the air/oil mixture entering the breather, is impelled at high rotational speed. The dynamic head of the oil is used to deliver the oil from the scrolls to a location of use without the need for any additional pumps.

Oil in scroll 62 passes into a pipe 66 which returns it via a cooler 68 to the tank 18 from which is forced by the pressure in the oil tank to the inlet 19 of the main pump 20. A line 80 conveys oil from inlet 19 to an additional rotating compartment 70 filled with RETIMET on the breather shaft, which constitutes the main pump 20. In passing through compartment 70 the clean cool oil picks up its dynamic head and passes into scroll 64.

Oil in scroll 64 is supplied to line 72 under its dynamic head, and line 72 communicates with the main oil supply gallery 23. A conventional relief valve 74 is provided to spill excess oil back to the pump inlet line 80. The relief valve 74 obtains its reference pressure from one of the bearing chamber via a line 76.

Thus it can be seen that by suitable positioning of the vents in the bearing chambers, it can be arranged that at least one of the vents is returning oil under pressure to the scavenge line 60 no matter what the attitude of the aircraft is, or what "g" forces are acting on the oil system.

Thus in this embodiment the first re-circulatory oil system is constituted by the breather/pump 30 having a first inlet in the oil tank 18 which supplies oil to the breather/pump compartment 70 under normal or non-aerobatic flight of the aircraft, scroll 64 having an outlet to the main oil supply gallery 23, scavenge line 60 which returns pressurised oil from the bearing chambers to the gearbox 22 and the breather/pump compartment 31 which returns the separated oil to the tank 18. The second re-circulatory system is constituted by the breather/pump compartment 31 which has its inlet in the gearbox to which the scavenge line 60 returns oil from the bearing chambers, and which has a common oulet in scroll 64 with the first system for pumping the oil to the main oil gallery 23.

Clearly the scroll 64 must be preferentially sited in order to ensure that under any flight conditions of the aircraft the main pump outlet is always supplied with oil.

In an embodiment in which the breather in the gearbox provides one or both of the primary and secondary pumping functions the oil tank may form part of the gearbox. In this case it is merely necessary to provide two separate inlets to the two pumps at different locations in the gearbox to which oil gravitates under different aerobatic conditions so that at least one of the pumps is always supplied with oil for operation no matter what the aircraft attitude is.

FIG. 5 shows a modification of the FIG. 2 arrangement in which the valves 37 and 38 are eliminated by modifications to the oil tank 18. The remaining features of the FIG. 2 arrangement are given the same reference numerals in FIG. 5.

The tank 18 in this modification is provided with a baffle 90 which extends from the mid-height of the tank towards the bottom, (in normal flight) where a dished oil catcher 91 is provided to which is connected the inlet 19 of the main pressure pump 20 of the system. The oil returning from the breather/pump 30, instead of joining the scavenge 26, is taken separately back to the tank 18 through line 35, and is directed as a jet between the baffle 90 and the side-wall of the tank.

The first re-circulatory system thus remains unchanged and comprises the main pump 20 and scavenge system 24, 25 and 26. The second re-circulatory system now however, includes both pumps 20 and 30 and operates as follows: When the aircraft inverts, the oil in the bottom of the tank falls away, and the breather/pump 30 returns oil from the bearing chamber vents 27 back directly to the tank 18 via line 35. The returned oil is directed at the catcher 91 and enters the inlet 19 of the main pump 20 which thus continues to operate normally. Thus the second pump 30 still has its inlet 31a disposed at a location 29 in the gearbox 22 to which the oil migrates during inverted flight, but now the oil is supplied indirectly from the pump 30 to the bearings via the tank 18 and the main pump 20, before being returned to the location 29 from the bearing chamber vents 27.

I claim:

1. An oil supply system for use with an engine having engine bearings and subject to orientation in first and second engine positions, said oil system comprising:
   an oil tank configured to receive a quantity of oil;
   pump means, having an inlet coupled to said oil tank and an outlet, for pumping oil from said oil tank to said outlet;
   first ducting means coupled to said pump outlet for supplying oil pumped from said tank to the bearings of an engine when an engine is in a first position;
   second ducting means coupled to receive scavenge oil from the bearings of an engine; and
   means coupled to said second ducting means for providing said scavenged oil to said tank when an engine is in said first position and for providing said scavenged oil to said first ducting means for providing said scavenged oil to the engine bearings when an engine is in a second position.

2. The oil supply system of claim 1 wherein said means for providing is an air/oil separator having a rotatable compartment containing a porous material into which a scavenged air/oil mixture is directed from said second ducting means for centrifugal separation and includes means for venting separated air to the atmosphere, means for directing separated oil to said tank when an engine is in said first position, and means for directing separated oil to said first ducting means when an engine is in said second position.

3. The oil supply system of claim 2 wherein said air/oil separator is a scavenge oil pump.

4. The oil system of claim 1 further comprising means for draining oil from a bearing when an engine is in said first position and supplying that drained oil to said tank, and wherein said second ducting means drains oil from a bearing when an engine is in said second position to supply oil to said means for providing.

5. In an aircraft gas turbine engine which may be oriented in first and second positions and having an engine bearing enclosed by a chamber, an engine gearbox and an oil supply system coupled to provide oil to said engine bearing, the improvement in said oil supply system comprising:
   an oil tank;
   first ducting means coupled to provide a conduit to said chamber for providing oil to said bearing;
   second ducting means coupled to said chamber for providing a conduit for receiving oil when said aircraft engine is in said second position; and
   a rotary air/oil separator positioned in said engine gearbox and coupled to said first and second ducting means, said air/oil separator having at least one rotatable compartment containing a porous material for receiving an air/oil mixture from said second ducting means for separating said air and oil and including means for venting separated air to the atmosphere, means for supplying oil from said tank to said first ducting means when said aircraft engine is in said first position, means for supplying separated oil to said tank when said aircraft engine is in said first position, and means for supplying at least a portion of said separated oil to said first ducting means to supply oil to said bearings when said aircraft engine is in said second position.

6. An aircraft gas turbine engine which may be oriented in first and second positions and having engine bearings enclosed by a chamber, an engine gearbox, and an oil supply system for supplying oil to said engine bearings, the improvement in said oil supply system comprising:

an oil tank;
first ducting means coupled to provide a conduit to said chamber;
first pump means coupled to pump oil from said tank to said first ducting means for providing oil to said bearings when said aircraft engine is in said first position;
second ducting means coupled to provide a conduit to said chamber;
second pump means comprising a rotary air/oil separator positioned in said engine gearbox and having at least one rotatable compartment coupled to said second ducting means and including a porous material into which an air/oil mixture is directed from said second ducting means to separate said air and oil and further including means for venting separated air to the atmosphere and means for providing an output of separated oil; and
means coupled to said output for supplying separated oil to said oil tank when said aircraft engine is in said first position and for supplying separated oil to said first ducting means when said aircraft engine is in said second position.

7. The system of claim 6 wherein said means for supplying comprises a control valve arrangement including a first relief valve means coupled in parallel with said first pump means and having an operation pressure setting for maintaining oil pressure in said first ducting means at a predetermined pressure, a bleed line means coupled to provide oil from said output to said first ducting means and including a non-return check valve, and a second relief valve means coupled to said output for controlling pressure in said bleed line means and constructed to have an operation pressure setting lower than the operation pressure setting of said first relief valve means.

8. The oil supply system of claim 1 wherein said pump means and said means coupled to said second ducting means are formed as a rotary air/oil separator having first and second inlets and first and second outlets and a rotatable compartment containing a porous material which generates a pumping action upon rotation, said first inlet being coupled to said oil tank, said second inlet being coupled to said second ducting means, said first outlet being coupled to said first ducting means and said second outlet being coupled to return excess oil to said oil tank.

9. The oil supply system of claim 1 wherein said means coupled to said second ducting means is constructed to provide said scavenged oil to said tank when an engine is in said first position and to provide said scavenged oil to said first ducting means through said inlet of said pump means to provide said scavenged oil to the engine bearings when an engine is in a second position.

10. The oil supply system of claim 2 wherein said means for directing separated oil to said first ducting means when an engine is in said second position directs said separated oil to said first ducting means through the inlet of said pump means.

* * * * *